US012626427B2

(12) United States Patent
Phogat et al.

(10) Patent No.: US 12,626,427 B2
(45) Date of Patent: May 12, 2026

(54) DIGITAL DESIGN RECOLORING AND ENHANCEMENT METHODS UTILIZING A TEXT-TO-IMAGE DIFFUSION MODEL

(71) Applicant: Adobe Inc., San Jose, CA (US)

(72) Inventors: Ankit Phogat, Noida (IN); Souymodip Chakraborty, Bangalore (IN); Sumit Chaturvedi, Noida (IN); Sumit Dhingra, New Delhi (IN); Vineet Batra, Pitam Pura (IN); Vishwas Jain, Bangalore (IN)

(73) Assignee: Adobe Inc., San Jose, CA (US)

( * ) Notice: Subject to any disclaimer, the term of this patent is extended or adjusted under 35 U.S.C. 154(b) by 263 days.

(21) Appl. No.: 18/459,159

(22) Filed: Aug. 31, 2023

(65) Prior Publication Data

US 2025/0078341 A1 Mar. 6, 2025

(51) Int. Cl.
*G06T 11/00* (2006.01)
(52) U.S. Cl.
CPC .................................. *G06T 11/001* (2013.01)
(58) Field of Classification Search
CPC ....................................................... G06T 11/001
See application file for complete search history.

(56) References Cited

U.S. PATENT DOCUMENTS

| | | | | |
|---|---|---|---|---|
| 6,384,836 | B1 * | 5/2002 | Naylor, Jr. ........... | H04N 1/6058 |
| | | | | 345/589 |
| 11,043,012 | B2 | 6/2021 | Phogat et al. | |
| 11,455,753 | B1 * | 9/2022 | Alemi ..................... | G06T 11/00 |
| 2009/0148040 | A1 * | 6/2009 | Tin ........................ | H04N 1/6058 |
| | | | | 382/167 |
| 2012/0075331 | A1 * | 3/2012 | Mallick ................ | G06V 40/162 |
| | | | | 345/594 |

OTHER PUBLICATIONS

Arici Tarik, Dikbas Salih, and Altunbasak Yucel. A histogram modification framework and its application for image contrast enhancement. Image Processing, IEEE Transactions on, 18:1921-1935, Oct. 2009.
Erik Reinhard, Michael Ashikhmin, Bruce Gooch, and Peter Shirley. Color transfer between images. IEEE Comput. Graph. Appl., 21(5):34-41, Sep. 2001.

(Continued)

*Primary Examiner* — Antonio A Caschera
(74) *Attorney, Agent, or Firm* — Keller Preece PLLC

(57) ABSTRACT

The systems, methods, and non-transitory computer-readable media include recoloring a digital design according to colors of a digital image and further generating an enhanced recolored digital design. In particular, in some embodiments, the disclosed systems identify a digital image for recoloring a digital design and recolors the digital design utilizing a color affine transformation algorithm to generate a recolored digital design. Further, in some embodiments, the disclosed systems generate the enhanced recolored digital design by transforming one or more colors of the recolored digital design to be within a range of the colors of the digital image utilizing a convex hull projection method. Moreover, in some embodiments, the disclosed systems further enhance the recolored digital design utilizing a contrast enhancement algorithm to modify luminescence values.

20 Claims, 11 Drawing Sheets

(56) References Cited

OTHER PUBLICATIONS

Huiwen Chang, Ohad Fried, Yiming Liu, Stephen DiVerdi, and Adam Finkelstein. Palette-based photo recoloring. ACM Transactions on Graphics (Proc. SIGGRAPH), 34(4), Jul. 2015.
Richard Zhang, Phillip Isola, and Alexei A Efros. Colorful image colorization. In ECCV, 2016.
Roger A. Horn and Charles R. Johnson. Topics in Matrix Analysis. Cambridge University Press, 1991.
Sharon Lin, Daniel Ritchie, Matthew Fisher, and Pat Hanrahan. Probabilistic color-by-numbers: Suggesting pattern colorizations using factor graphs. ACM Transactions on Graphics (TOG), 32(4):1-12, 2013.
Xuezhong Xiao and Lizhuang Ma. Color transfer in correlated color space. pp. 305-309, Jun. 2006.

* cited by examiner

900

Receiving An Indication Of A Selection Of A Digital Design 902

Receiving A Text Prompt 904

Generating, Utilizing A Text-To-Image Diffusion Model, A Digital Image 906

Generating A Recolored Digital Design By Utilizing An Affine Transformation 908

Providing The Recolored Digital Design 910

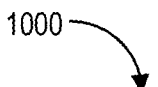

1000

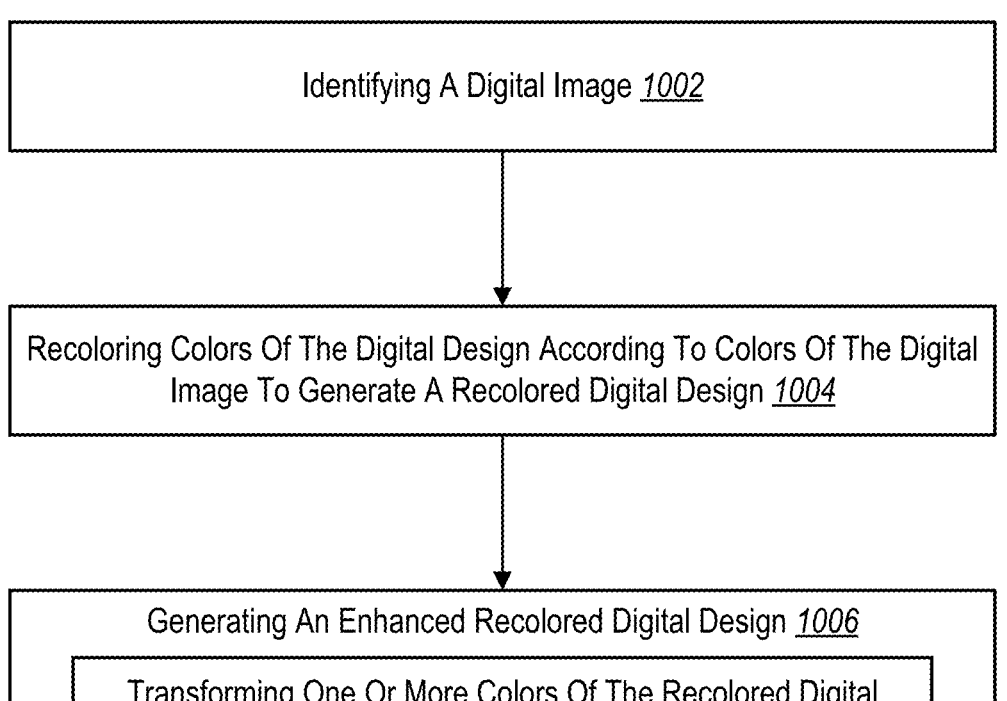

Identifying A Digital Image *1002*

Recoloring Colors Of The Digital Design According To Colors Of The Digital Image To Generate A Recolored Digital Design *1004*

Generating An Enhanced Recolored Digital Design *1006*

Transforming One Or More Colors Of The Recolored Digital Design To Be Within A Range Of The Colors Of The Digital Image *1008*

Modifying Luminescence Values Of The Recolored Digital Design *1010*

*Fig. 10*

DIGITAL DESIGN RECOLORING AND ENHANCEMENT METHODS UTILIZING A TEXT-TO-IMAGE DIFFUSION MODEL

BACKGROUND

Recent years have seen significant advancement in hardware and software platforms for modifying digital designs to produce modified color schemes that convey a certain theme or concept. For example, many platforms offer software applications that provide tools to edit elements such as colors within a digital design. For instance, many platforms provide the option for a user to manipulate colors of a digital design and then to manually adjust elements of the digital design in response to manipulating the colors. However, despite these advancements, existing software platform systems for modifying digital designs continue to suffer from a variety of problems with regard to efficiency and operational flexibility.

SUMMARY

One or more embodiments described herein provide benefits and/or solve one or more of problems in the art with systems, methods, and non-transitory computer-readable media that recolor a digital design based on a color theme from a digital image. More particularly, in one or more implementations, the systems recolor a digital design based on a color theme from a digital image generated utilizing a text-to-image diffusion model. For instance, in one or more embodiments, the disclosed system preserves the geometry of the digital design and takes on the digital image's look and feel by transferring the color variations of the digital image to the digital design. In some embodiments, the disclosed system recolors the digital design using a color affine transformation algorithm. Further, in some embodiments, the disclosed system generates an enhanced recolored digital design by using a convex hull projection and contrast enhancement tailored to address issues that arise during color transfer via the color affine transformation algorithm.

Additionally, in some embodiments, the disclosed system receives an indication of a selection of a digital design and a text prompt input. Further, in some embodiments, the disclosed system generates a digital image from the text prompt using a diffusion model. Moreover, in some embodiments, the disclosed system recolors a digital design according to colors of the digital image.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 10 illustrates a flowchart of a series of acts for generating an enhanced recolored digital design in accordance with one or more embodiments;

DETAILED DESCRIPTION

Figure 1:
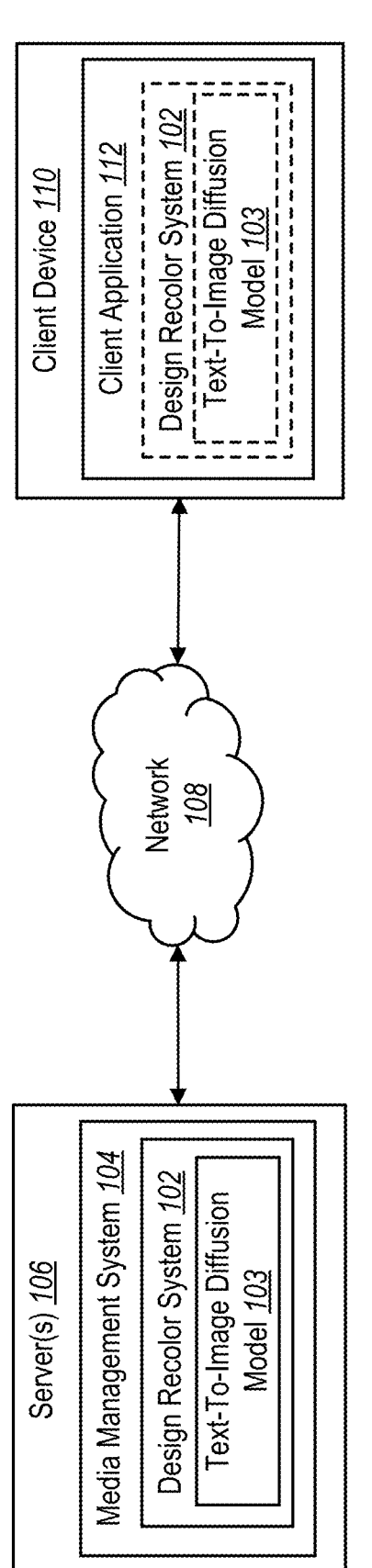
FIG. 1 illustrates an example environment in which a design recolor system operates in accordance with one or more embodiments.

One or more embodiments described herein include a design recoloring system that transfers color variations from a digital image to a digital design (e.g., a scalable vector graphic) and further enhances a recolored digital design by utilizing a convex hull projection method and a contrast enhancement algorithm. Conventional systems have a number of disadvantages with respect to recoloring digital designs. For example, conventional recoloring systems suffer from several technological shortcomings that result in inefficient and inflexible operation. In particular, conventional systems require a designer to provide a specific reference image for each color variation to recolor a specified digital design. To illustrate, designers in a conventional system are typically required to parse through large image datasets to locate an image with a desired color scheme/theme or a designer must manually create the color scheme.

Further, conventional systems also require excessive designer interactions with a color-modified digital design. For instance, in conventional systems, modifying colors within a digital design causes alterations to the geometry and overall structure of the digital design. As such, conventional systems typically require a designer to spend time and computational resources to rectify inadvertent alterations from color modifications to the digital design. Accordingly, due to conventional systems requiring a designer to provide a specific reference image and fixing alterations that result from color modifications, conventional systems suffer from a variety of computational inefficiencies.

As mentioned, in addition to computational inefficiencies, conventional systems also suffer from operational inflexibility. For example, conventional systems are typically limited to colorizing grayscale images and transferring colors between natural images. Further, as mentioned, conventional systems typically require a designer to provide a specific reference image for colorizing grayscale images and transferring colors between natural images. For instance, conventional systems are operationally restricted to color transfers within a range of digital images that a designer has access to. Accordingly, because conventional systems suffer from computational inefficiencies, this further exacerbates problems with operational inflexibility.

In one or more embodiments, the design recolor system quantizes pixel values (e.g., utilizing a clustering algorithm) of the digital design prior to utilizing a color affine transformation algorithm. For instance, in some embodiments, digital designs contain thousands of colors and the design recolor system utilizes quantization to reduce the range of colors to a smaller range (e.g., reduce the color palette size). Further, in some embodiments, quantization of the pixel values helps colors within the digital design maintain their relationship. Moreover, in one or more embodiments, quantization improves the effectiveness of a color affine transformation (e.g., because the range of colors is reduced and color quantization results in an efficient representation of colors in an image/design).

As mentioned above, the design recolor system utilizes a color affine transformation algorithm. For instance, in some embodiments, the color affine transformation algorithm includes a mechanism for extracting color features from the digital design (e.g., the target image) and the digital image and transforming color features of the digital design in accordance with the color scheme of the digital image (e.g., the source image). Further, when conventional systems utilize a color affine transformation algorithm there are quality issues and inaccuracies. Specifically, because color distributions of digital designs vary from digital images, color affine transformation algorithm sometime generate inaccurate recoloring of digital designs. Accordingly, in one or more embodiments, the design recolor system enhances recolored digital designs and rectifies inaccuracies in recoloring by utilizing a convex hull projection method and a contrast enhancement algorithm.

As mentioned above, the design recolor system further utilizes a convex hull projection method to enhance recolored digital design. For instance, in some embodiments, utilizing a color affine transformation algorithm results colors being mapped far from the region of colors of the digital image color space (e.g., source image color space). In such embodiments, the design recolor system generates a convex hull of the digital image and projects newly mapped colors (e.g., from the digital design) close to the surface of the convex hull.

As also mentioned above, the design recolor system utilizes the contrast enhancement algorithm to enhance recolored digital designs. For instance, in some embodiments, post-transformation via the convex hull projection method results in color dullness. In such embodiments, the design recolor system enhances luminescence values of the recolored digital design while leaving the hue values unchanged.

Furthermore, in one or more embodiments, the design recolor system improves efficiency over prior systems. For example, as mentioned, conventional systems tend to suffer from requiring designers to provide a specific reference image. In one or more embodiments, the design recolor system overcomes requiring designers to provide a specific reference image by receiving, via input from a client device, a text prompt and generating a digital image from the text prompt utilizing a text-to-image diffusion model. In particular, in some embodiments, the design recolor system receives a text prompt from a designer indicating specific color schemes/themes and the design recolor system generates the digital image according to the indications of the text prompt. In doing so, the design recolor system overcomes inefficiency issues of expending significant computational resources and time to locate a specific type of color scheme/theme.

Furthermore, as mentioned, conventional systems suffer from excessive user interactions in response to color modifications altering the structure and geometry of digital designs. For example, the design recolor system overcomes the issue of altered structures and geometry of the digital design by utilizing a color affine transformation algorithm to generate a recolored digital design and further enhancing the recolored digital design. In particular, in some embodiments the design recolor system transforms one or more colors of the recolored digital design utilizing a convex hull projection method and further modifies luminescence values of the recolored digital design transformed according to the convex hull projection method. For instance, using one or more of the combination of the color affine transformation, the convex hull projection method, and the contrast enhancement avoids issues regarding altered structure and/or geometry of the digital design.

In addition to efficiency improvements, in one or more embodiments, the design recolor system improves operational flexibility over prior systems. For reasons similar to those described in relation to the efficiency improvements, the design recolor system is able to flexibly adapt the generation of digital images from text prompts to span a near infinite range of color variations without requiring an exemplar image as input. Furthermore, in some embodiments, the design recolors digital designs (e.g., SVGs) in a manner superior to conventional systems.

Specifically, in some embodiments, the design recolor system utilizes quantization, a color affine transformation algorithm, a convex hull projection method, and a contrast enhancement algorithm. In such embodiments, the design recolor system generates an enhanced recolored digital design with the geometry and structure of the initial digital design preserved. Thus, in contrast to some prior systems that are rigidly fixed to recoloring grayscale images or natural images, in one or more embodiments, the design recolor system has a diverse capability to recolor digital designs in a high-quality and efficient manner.

Additional detail regarding the design recolor system will now be provided with reference to the figures. For example, FIG. 1 illustrates a schematic diagram of an exemplary system environment 100 in which the design recolor system 102 operates. As illustrated in FIG. 1, the system environment 100 includes a server(s) 106, a media management system 104, a network 108, a client device 110, and a client application 112.

Although the system environment 100 of FIG. 1 is depicted as having a particular number of components, the system environment 100 is capable of having a different number of additional or alternative components (e.g., a different number of servers, client devices, or other components in communication with the design recolor system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 11). Moreover, the server(s) 106 and the client device 110 include one or more of a variety of computing devices (including one or more computing devices as discussed in greater detail in relation to FIG. 11).

As mentioned above, the system environment 100 includes the server(s) 106. In one or more embodiments, the server(s) 106 processes text prompts from a user of the client application 112 to generate a digital image. In one or more embodiments, the server(s) 106 comprises a data server. In some implementations, the server(s) 106 comprises a communication server or a web-hosting server.

In one or more embodiments, the client device 110 includes a computing device that is able to generate and/or provide, for display, a digital design and/or a digital image on the client application 112. For example, the client device 110 includes smartphones, tablets, desktop computers, laptop computers, head-mounted-display devices, or other electronic devices. The client device 110 includes one or more applications (e.g., an image generation application) for processing text prompts and recoloring digital designs or digital images in accordance with the media management system 104. For example, in one or more embodiments, the client application 112 works in tandem with the design recolor system 102 to process text prompts utilizing a text-to-image diffusion neural network 103 to generate text-conditioned images. In particular, the client application 112 includes a software application installed on the client device 110. Additionally, or alternatively, the client application 112 of the client device 110 includes a software application hosted on the server(s) 106 which may be accessed by the client device 110 through another application, such as a web browser.

To provide an example implementation, in some embodiments, the design recolor system 102 on the server(s) 106 supports the design recolor system 102 on the client device 110. For instance, in some cases, the media management system 104 on the server(s) 106 gathers data for the design recolor system 102. In response, the design recolor system 102, via the server(s) 106, provides the information to the client device 110. In other words, the client device 110 obtains (e.g., downloads) the design recolor system 102 from the server(s) 106. Once downloaded, the design recolor system 102 on the client device 110 utilizes the text-to-image diffusion neural network 103 to generate a digital image and subsequently recolor a digital design according to the digital image.

In alternative implementations, the design recolor system 102 includes a web hosting application that allows the client device 110 to interact with content and services hosted on the server(s) 106. To illustrate, in one or more implementations, the client device 110 accesses a software application supported by the server(s) 106. In response, the design recolor system 102 on the server(s) 106, recolors digital designs and utilizes various algorithms (e.g., for recoloring and enhancement). The server(s) 106 then provides the recolored digital design to the client device 110 for display.

To illustrate, in some cases, the design recolor system 102 on the client device 110 receives a text prompt that includes an indication of colors. The client device 110 transmits the text prompt with the multiple concepts to the server(s) 106. In response, the design recolor system 102 on the server(s) 106 utilizes a diffusion neural network to generate a text-conditioned image.

Indeed, in some embodiments, the design recolor system 102 is implemented in whole, or in part, by the individual elements of the system environment 100. For instance, although FIG. 1 illustrates the design recolor system 102 implemented or hosted on the server(s) 106, different components of the design recolor system 102 are able to be implemented by a variety of devices within the system environment 100. For example, one or more (or all) components of the design recolor system 102 are implemented by a different computing device (e.g., the client device 110) or a separate server from the server(s) 106. Indeed, as shown in FIG. 1, the client device 110 includes the design recolor system 102. Example components of the design recolor system 102 will be described below with regard to FIG. 11.

Figure 2:
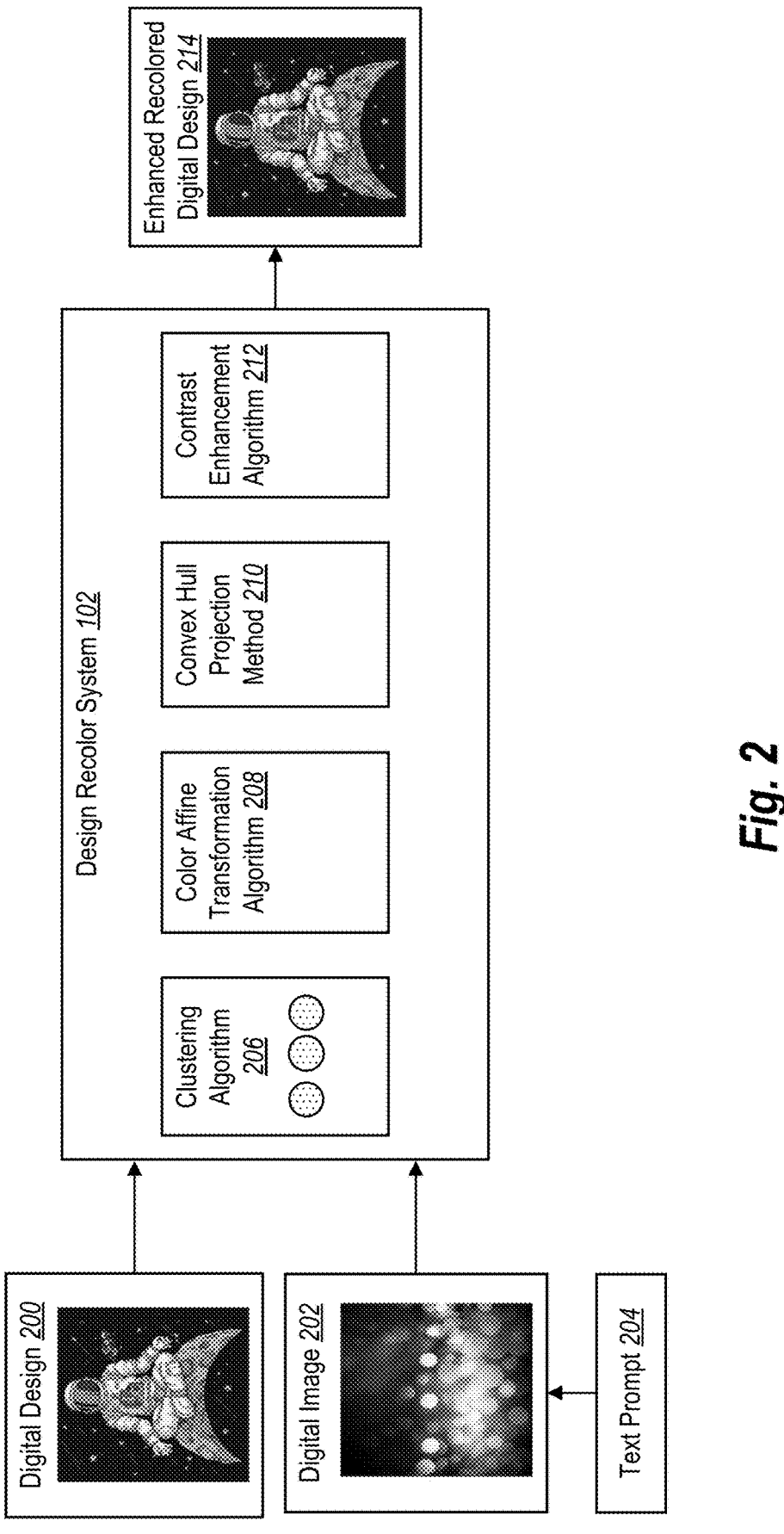
FIG. 2 illustrates an overview of the design recolor system generating an enhanced recolored digital design in accordance with one or more embodiments.

As mentioned above, in certain embodiments, the design recolor system 102 generates an enhanced recolored digital design. FIG. 2 illustrates an overview of the design recolor system 102 generating an enhanced recolored digital design utilizing various algorithms and methods in accordance with one or more embodiments. For example, FIG. 2 shows the design recolor system 102 receiving a digital image 202 (e.g., PNG or a JPEG) generated from a text prompt 204. In one or more embodiments, the design recolor system 102 processes the text prompt 204 that describes or indicates one or more colors (e.g., color features, color schemes, or color themes). Specifically, the design recolor system 102 processes the text prompt 204 to generate the digital image 202 from the text prompt 204.

In one or more embodiments, the digital image 202 includes an image designated as a source for transferring colors. Specifically, the design recolor system 102 obtains the digital image 202 by utilizing a text-to-image diffusion neural network and transfers colors from the digital image 202 to a digital design 200 (e.g., a SVG). Further, the digital image 202 includes discrete pixel values that indicates various colors or grayscale values. Additional details regarding the design recolor system 102 generating the digital image 202 from the text prompt 204 via a text-to-image diffusion model is given below in the description of FIG. 6.

Moreover, FIG. 2 shows the design recolor system 102 receiving the digital design 200. In one or more embodiments, the design recolor system 102 receives the digital design 200 (e.g., a target design) for recoloring purposes. For instance, the digital design 200 includes a file with various design properties and digital design elements. Furthermore, the design recolor system 102 receives an indication of the digital design 200 from a designer of a client device directly uploading the digital design 200 or selecting the digital design from a curated database. For instance, the digital design 200 includes a scalable vector graphic.

In one or more embodiments, the scalable vector graphic includes various mathematical equations to define lines, shapes, and curves. In particular, the scalable vector graphic includes a resolution-independent image. For instance, scaling up or down the scalable vector graphic does not result in a loss of quality. Furthermore, the scalable vector graphic includes graphical elements utilized as icons, logos, charts, maps on various digital applications and computing devices.

Further in some embodiments, the design recolor system 102 recolors the digital design 200 by modifying color features. In one or more embodiments, color features include specific attributes or characteristics of one or more colors in the digital design 200. For instance, color features include a distribution of color values within the digital design 200, statistical properties (e.g., a statistical distribution) of the digital design 200 (e.g., mean, and standard deviation), the dominance of certain colors within the digital design 200, a color gradient, and color balance.

Further, FIG. 2 shows the design recolor system 102 utilizing a series of algorithms/methods to generate an enhanced recolored digital design 214. For instance, FIG. 2 shows the design recolor system 102 utilizing a clustering algorithm 206 for quantization of the digital design 200. In one or more embodiments, the design recolor system 102 utilizes the clustering algorithm 206 to group similar colors in the digital design 200 and determines an average pixel color value of each of the groups of similar colors. Further, the design recolor system 102 uses the average pixel color value of each color group as representative of the digital design 200, which reduces the color range of the digital design 200.

Moreover, in some embodiments, the design recolor system 102 utilizes the clustering algorithm to initialize a set of color clusters with a range of colors smaller than a range of colors of the digital design 200. Specifically, the design recolor system 102 assigns colors of the digital design 200 to the set of color clusters which maintains color relationships within the digital design 200 and reduces the color palette size (e.g., the range) of the digital design 200. Additional details are given below in FIG. 3.

Further, FIG. 2 shows the design recolor system 102 utilizing a color affine transformation algorithm 208. Specifically, the color affine transformation algorithm 208 includes extracting colors from the digital image 202 and the digital design 200 for transforming colors of the digital design 200 according to the digital image 202. For instance, the color affine transformation algorithm 208 includes generating three-dimensional (e.g., red, green, and blue) array representations of the digital image 202 and the digital design 200. Moreover, the design recolor system 102 utilizes the color affine transformation algorithm 208 to generate additional sets of array representations to perform translation, scaling, and rotation operations on the three-dimensional array representations of the digital design 200. Additional details are provided below in the description of FIG. 4.

Moreover, FIG. 2 shows the design recolor system 102 utilizing a convex hull projection method 210. For instance, in some embodiments the convex hull projection method 210 includes projecting colors from a recolored digital design to the convex hull of the digital image 202. Further, by projecting the colors from the recolored digital design, the design recolor system 102 brings the colors closer to the color range of the digital image 202. Additional details are provided below in the description of FIG. 5.

Furthermore, FIG. 2 shows the design recolor system 102 utilizing a contrast enhancement algorithm 212. In some embodiments the contrast enhancement algorithm 212 includes an enhancement method based on a color histogram. For instance, a color histogram represents a distribution of colors within the recolored digital design (e.g., transformed according to the convex hull projection method). Further, in some embodiments the design recolor system 102 modifies the brightness and/or darkness values of the recolored digital design while not modifying the hue values. Additional details are provided below in the description of FIG. 5.

As further shown in FIG. 2, the design recolor system 102 generates an enhanced recolored digital design 214. Specifically, the design recolor system 102 generates the enhanced recolored digital design 214 by utilizing the clustering algorithm 206, the color affine transformation algorithm 208, the convex hull projection method 210, and the contrast enhancement algorithm 212.

Figure 3:
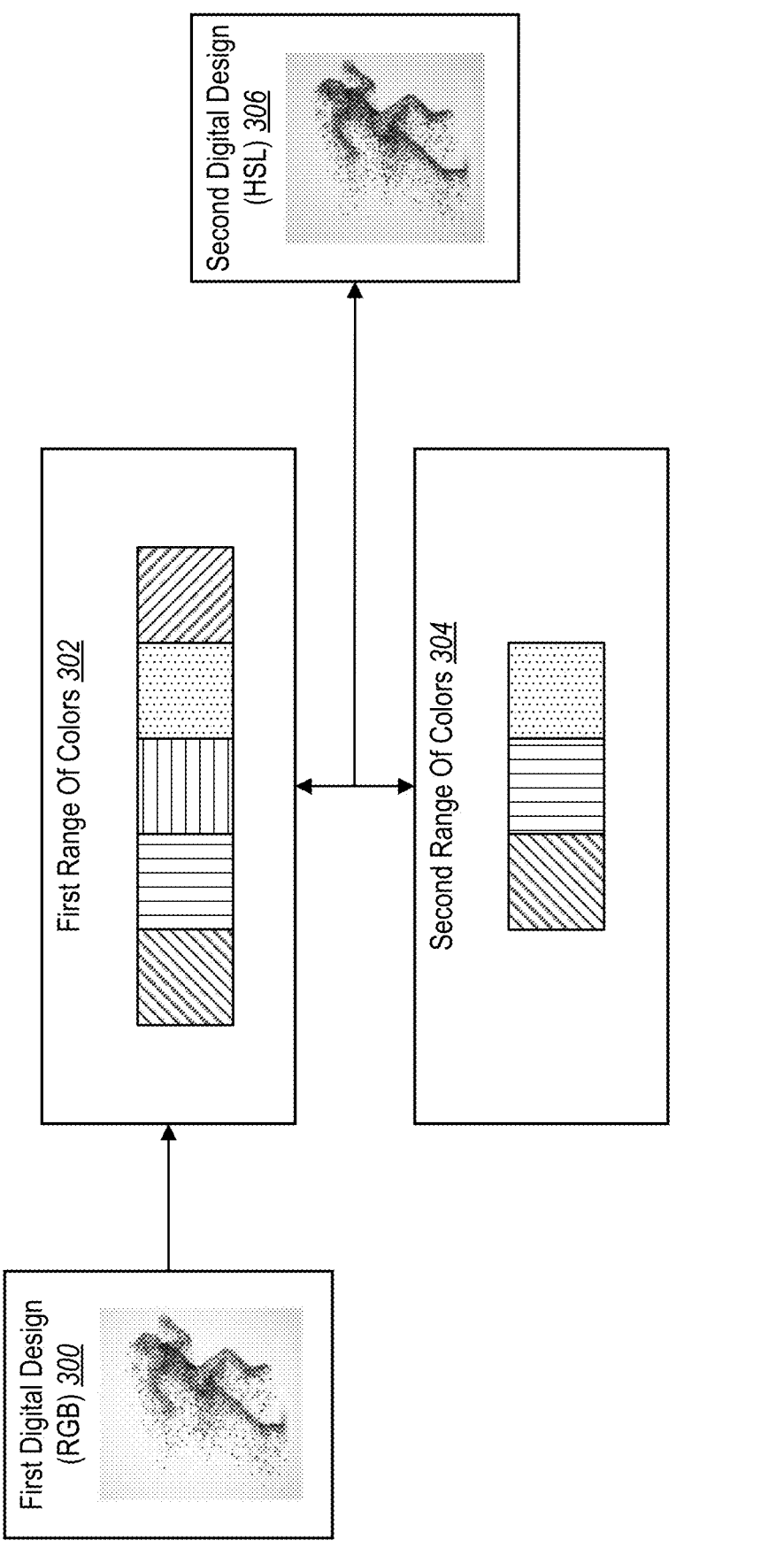
FIG. 3 illustrates a diagram of the design recolor system reducing a range of colors of the digital design in accordance with one or more embodiments.

As mentioned above, in certain embodiments, the design recolor system 102 reduces a range of colors of a digital design (e.g., quantization). For example, FIG. 3 shows the design recolor system 102 reducing a color range of a digital design by converting the digital design to another color space in accordance with one or more embodiments. Specifically, the design recolor system 102 does so to reduce the number of pixel values that the design recolor system 102 has to deal with in performing a color affine transformation (e.g., the design recolor system 102 groups together similar colors in preparation for a color affine transformation).

As mentioned above, for recoloring digital designs, a common expectation includes maintaining the initial relationships and structure of the digital design (e.g., maintain the tints and shades of the digital design in a final output post-recoloring). In one or more embodiments, the design recolor system 102 accomplishes maintaining the initial relationships and structure within a digital design by incorporating various clustering techniques to reduce the color range.

As shown in FIG. 3, the design recolor system 102 receives a first digital design 300. Specifically, the first digital design 300 includes the digital design in a first color space, namely an RGB color space. In one or more embodiment the RGB color space includes a method of representing colors in a three-dimensional coordinate system using the primary colors red, green, and blue. Further, the RGB color space includes a wide gamut of colors relative to other color spaces such as the HSL color space discussed below.

As shown in FIG. 3, the first digital design 300 contains a first range of colors 302. For instance, the first range of colors 302 includes a set of colors (e.g., a color palette) that share a common theme or grouping based on specific requirements. Specifically, a range of colors typically includes a combination of colors to create a particular feeling or aesthetic. To illustrate, a range of colors include monochromatic (e.g., shades, tints, and tones of a single base color), analogous (e.g., adjacent colors on a color wheel), complementary (e.g., colors opposite of each other on the color wheel), triadic colors (e.g., three colors evenly spaced on a color wheel), neutral colors (e.g., brown, or grey), warm colors (e.g., red, orange, yellow), or cool colors (e.g., blue, green, purple).

Further, FIG. 3 shows the design recolor system 102 comparing the first range of colors 302 to a second range of colors 304. For instance, in some embodiments the design recolor system 102 identifies the second range of colors 304 as initialized by a designer of the design recolor system 102. To illustrate, a designer of the design recolor system 102 indicates an amount to reduce the first range of colors 302 by, and the design recolor system 102 configures an algorithm to reduce the first range of colors 302 by the indicated amount (e.g., 50% or a specific number of clusters to group the colors in the digital design to, such as ten). Moreover, in some instances, the design recolor system 102 identifies the second range of colors 304 based on a designer of the design recolor system 102 indicating a specific color space to convert the initial color space.

In one or more embodiments, the design recolor system 102 reduces (e.g., performs quantization) the first range of colors 302 of the first digital design 300 based on the comparison between the first range of colors 302 and the second range of colors 304. In other words, the design recolor system 102 reduces the range of colors by determining average color pixel values for similar colors of the first range of colors 302 and reducing the first range of colors 302 to merely include the average color pixel values. To illustrate, the design recolor system 102 determines all colors of the first digital design 300 that fall within a red color range (e.g., a red channel of 200-255 and a green/blue channel from 0-100). Further, the design recolor system 102 determines the average three-dimensional channel value for all the colors within the red color range and designates all the red color range values as the average three-dimensional channel value.

In one or more embodiments, the design recolor system 102 reduces the first range of colors 302 to the second range of colors 304 by utilizing a clustering algorithm. For instance, the design recolor system 102 utilizes the clustering algorithm by initializing a set of color clusters that corresponds with the second range of colors 304. Further, in some embodiments each cluster of the set of color clusters represents colors grouped together by similarity (e.g., within a certain pixel value threshold range).

Moreover, in one or more embodiments, the design recolor system 102 utilizes the clustering algorithm by comparing each color of the first digital design 300 to each cluster of the initialized set of color clusters. In particular, the design recolor system 102 compares each color to each cluster to determine which cluster to associate the color.

To illustrate, the design recolor system 102 utilizes a hue-saturation-lightness clustering algorithm (i.e., hereinafter referred to as HSL clustering algorithm) to group similar colors in a digital design based on hue, saturation, and lightness components. For instance, the design recolor system 102 compares a first color of the first digital design 300 to a first cluster of the set of color clusters (e.g., each cluster of the set of color clusters is represented by the average color within the cluster). Further, the design recolor system 102 determines whether a hue value of the first color falls within a predefined hue threshold of the first cluster (e.g., taking into account the cyclicity of hue). In one or more embodiments, the hue value indicates the type of color. For instance, the hue value ranges from 0 to 360 degrees where 0 and 360 represent red, 120 represents green, and 240 represents blue. Of importance, the HSL color space is typically considered to convey more human differentiable colors (e.g., a human perceptible difference of color shades).

Furthermore, in one or more embodiments, the design recolor system 102 determines whether a saturation value of the first color matches a saturation value of the first cluster of the set of color clusters. For instance, in one or more embodiments, the saturation value indicates the intensity of the color as a percentage from 0% to 100%, where 0% includes complete desaturation or grayscale and 100% indicates fully saturated.

Moreover, in one or more embodiments, the design recolor system 102 determines whether a lightness value is within a predefined lightness threshold of the first cluster of the set of color clusters. For instance, lightness includes a perceived brightness of the color where a lightness value of 0 indicates black and 100 represents white.

To illustrate, in response to the design recolor system 102 utilizing the HSL clustering algorithm and determining that for the first color of the first digital design 300, the hue value falls within the predefined hue threshold of the first cluster, the saturation value matches a saturation value of the first cluster, and the lightness value is within a predefined lightness threshold of the first cluster—the design recolor system 102 assigns the first color to the first cluster. To reiterate, the design recolor system 102 performs the process of comparing each color of the first digital design 300 to each cluster of the set of clusters initialized by the design recolor system 102 via the HSL clustering algorithm.

In one or more embodiments, the design recolor system 102 determines that a second color of the first digital design 300 does not match or fall within a predefined threshold of any cluster of the set of color clusters initialized by the design recolor system 102 via the HSL clustering algorithm. In such embodiments, the design recolor system 102 initializes a new cluster for the second color of the first digital design 300. For instance, the new cluster includes a color grouping that was not within the set of color clusters and assigns the color to the new cluster.

Furthermore, as shown in FIG. 3, the design recolor system 102 reduces the first range of colors 302 to conform with the second range of colors 304 to generate a digital design 306 within a new color space. For instance, as shown the design recolor system 102 converts an initial RGB color space to an HSL color space. To illustrate, the HSL color space includes three dimensions of hue, saturation, and lightness. Furthermore, the HSL color space includes pixel values for adjusting brightness or saturation without modifying hue.

As mentioned above, the design recolor system 102 utilizes a color affine transformation algorithm to recolor a digital design based on a digital image (e.g., a source image). For example, FIG. 4 shows the design recolor system 102 generating three-dimensional array representations from a digital design and digital image in accordance with one or more embodiments.

Figure 4:
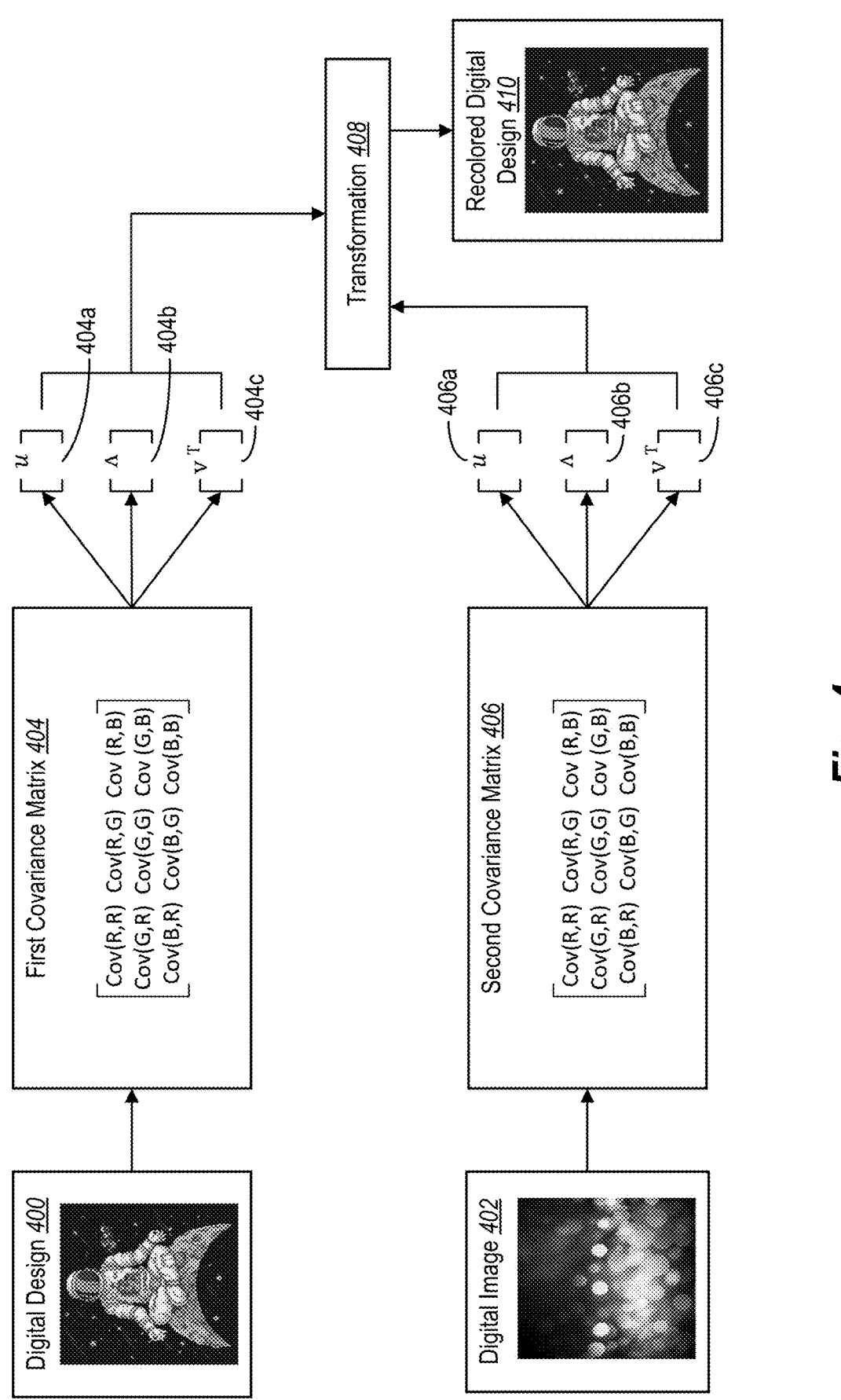
FIG. 4 illustrates a diagram of the design recolor system utilizing a color affine transformation algorithm in accordance with one or more embodiments.

As shown in FIG. 4, the design recolor system 102 applies the color affine transformation algorithm to a digital design 400 and a digital image 402. In one or more embodiments, the design recolor system 102 utilizes the color affine transformation algorithm to extract color features from a digital design 400 and to extract color features from the digital image 402. Specifically, the design recolor system 102 extracts the color features and transforms the color features of the digital design 400 to adhere to the color features (e.g., a color scheme) of the digital image 402.

In one or more embodiments, the design recolor system 102 extracts pixel color values of the digital image 402 defined in an RGB space. For instance, the digital image 402 indicates a source image S where $C_S(p)$ indicates color values of the pixel and where the pixel is indicated as $p \in S$ (e.g., the pixel is an element of the source image). Furthermore, the design recolor system 102 utilizes $R_s$, $G_s$, and $B_s$ as the three-color channel values of the color features for the digital image 402. To illustrate, the design recolor system 102 indicates extracting pixel color values of the digital image as follows:

$$C_s = (R_s, G_s, B_s, 1)^T \qquad (1)$$

In equation 1 above, the design recolor system 102 determines the color values of the digital image 402 as being the red, green, and blue values with an alpha channel of 1 (e.g., no transparent or opaque pixel values within the digital image 402). Further the T notation indicates a transposition of the R, G, B, and 1 matrix for the digital image 402.

As mentioned above in FIG. 3, the design recolor system 102 performs quantization on the digital design 400 to reduce a range of colors of the digital design 400. Further, in reducing the range of colors of the digital design 400, the design recolor system 102 deals with a smaller number of pixel values for the color affine transformation. In particular, because the quantization as discussed in FIG. 3 converts the digital design in an RGB color space to an HSL color space, in some embodiments the design recolor system 102 converts the clustered color values in the HSL color space back to an RGB color space to perform the color affine transformation. To illustrate, the design recolor system 102 utilizes an HSL-RGB function to normalize HSL values to determine normalized RGB values and to subsequently denormalize the RGB values. In sum, the design recolor system 102 utilizes an HSL-RGB function to convert the HSL functions to an RGB color space for performing the color affine transformation.

Furthermore, in some embodiments, prior to the design recolor system 102 extracting color features of the digital design 400 (e.g., in the RGB color space), the design recolor system 102 rasterizes the digital design 400. For instance, the design recolor system 102 rasterizes the digital design 400 utilizing a rasterization function that analyzes the digital design 400, sets a target resolution, creates a raster canvas, determines color features (color and transparency), fills pixels in the raster canvas, and renders the rasterized image from the digital design 400.

Moreover, the design recolor system 102 then extracts the color features of a rasterized version of the digital design 400 which is indicated as follows:

$$C_t = (R_{t_i}, G_{t_i}, B_{t_i}, 1)^T \qquad (2)$$

Similar to equation (1), here equation (2) also indicates the red, green, and blue pixel values for the digital design 400 (e.g., a target digital design to transfer the colors to) with an alpha channel of 1. Further the T notation indicates a transposition of the R, G, B, and 1 matrix for the digital design 400.

In one or more embodiments, the design recolor system 102 utilizes the extracted color values discussed above to generate a three-dimensional array representation for both the digital design 400 and the digital image 402. Further, in some embodiments a three-dimensional array representation includes an array of pixel values for the channels (e.g., red, green, and blue). Moreover, in some embodiments, the design recolor system 102 first generates a three-dimensional array representation of the color components of the digital design 400 and the digital image 402, then the design recolor system 102 generates covariance matrices. To illustrate, the design recolor system 102 calculates the mean along the three axes (e.g., red, green, and blue) and covariance matrices between the three color components for both the digital design 400 and the digital image 402.

For instance, for the covariance matrices, the design recolor system 102 determines a mean vector for the RGB values separately across all pixels of the digital design 400 and the digital image 402 (e.g., each row corresponds to a pixel). Furthermore, the design recolor system 102 subtracts the mean vector determined for the RGB values from each pixel vector in the initially generated matrix. Moreover, the design recolor system 102 determines the covariance as an average of the product of a particular dimension's deviation from their respective means. To illustrate, for a covariance of (R,G), the design recolor system 102 determines for a particular red pixel value a deviation from the average red pixel value and for a particular green pixel value a deviation from the average green pixel value. Further, the design recolor system 102 determines a product of the deviation of the particular red pixel value and the deviation of the particular green pixel value.

As shown in FIG. 4, the design recolor system 102 generates a first covariance matrix 404 from the digital design 400 and a second covariance matrix 406 from the digital image 402. To illustrate, the design recolor system 102 represents mean values of the digital image 402 (e.g., the source image) as $\widehat{R_s}$, $\widehat{G_s}$ and $\widehat{B_s}$ and the mean values of the digital design 400 as $\widehat{R_T}$, $\widehat{G_T}$ and $\widehat{B_T}$. Furthermore, the design recolor system 102 represents the first covariance matrix 404 as $\text{cov}_t$ and the second covariance matrix 406 as $\text{cov}_s$.

As further shown in FIG. 4, the design recolor system 102 generates a first set of arrays 404a-404c from the first covariance matrix 404 (e.g., a three-dimensional array representation of the digital design 400) and a second set of arrays 406a-406c from the second covariance matrix 406 (e.g., a three-dimensional array representation of the digital image 402). Specifically, the design recolor system 102 applies a singular value decomposition (e.g., hereinafter referred to as SVG) to the first covariance matrix 404 and the second covariance matrix 406 to generate the first set of arrays 404a-404c and the second set of arrays 406a-406c.

In one or more embodiments, the design recolor system 102 performs an eigen decomposition on the first covariance matrix 404 and the second covariance matrix 406 to determine eigenvectors and eigenvalues. For instance, an eigenvector includes transformations that continue to point a matrix in the same direction. In other words, an eigenvector includes directions that remain unchanged under the transformation of a matrix. Moreover, an eigenvalue indicates a scaling factor by which corresponding eigenvectors are stretched or shrunk when multiplied by a matrix. In other words, eigenvalues represent how much eigenvectors are scaled during transformation.

To illustrate, for calculating a single value decomposition for the first covariance matrix 404 and the second covariance matrix 406, the design recolor system 102 utilizes the following notation:

$$\text{Cov} = U \cdot \Lambda \cdot V^T \qquad (3)$$

In equation (3), U and V indicate orthogonal matrices that are composed of eigenvectors for corresponding covariance matrices. Further, in one or more embodiments, $\Lambda$ indicates a diagonal matrix for eigenvalues of corresponding covariance matrices. To illustrate, for $\Lambda = \text{diag}(\lambda^r, \lambda^g, \lambda^b)$, $\lambda_r$, $\lambda^g$, $\lambda^b$ are eigenvalues of the covariance matrices. Accordingly, as shown in FIG. 4, the design recolor system 102 generates the first set of arrays 404a-404c and the second set of arrays 406a-406c by applying a SVD.

Furthermore, in one or more embodiments, the design recolor system applies the SVD to the covariance matrices by 102 implementing the methods described in Roger A. Horn and Charles R. Johnson. Topics in Matrix Analysis. Cambridge University Press, 1991, which is fully incorporated herein by reference.

In one or more embodiments, the design recolor system 102 utilizes the color affine transformation algorithm to transform the color features of the digital design 400 according to the digital image 402. For instance, the design recolor system 102 bring homogenous color features of the digital design 400 to a normalized space by removing a translation component, rotation component $(U_t)$ and the scaling component $\Lambda$ of the first covariance matrix 404 $(\text{cov}_t)$. To illustrate, the design recolor system 102 accomplishes bringing the homogenous color features of the digital design 400 to a normalized space by a transformation $S_t \cdot R_t \cdot T_t$, where:

$T_t$:

$$[1\ 0\ 0\ \text{-}\widehat{R_T}]$$
$$[0\ 1\ 0\ \text{-}\widehat{G_T}]$$

-continued $$[0\ 0\ 1\ -\vec{B_T}]$$
$$[0\ 0\ 0\ 1]$$
$$S_t:$$

$$\left[\frac{1}{\lambda_t^r}\ \ 0\ \ 0\ \ 0\right]$$

$$\left[0\ \ \frac{1}{\lambda_t^g}\ \ 0\ \ 0\right]$$

$$\left[0\ \ 0\ \ \frac{1}{\lambda_t^b}\ \ 0\right]$$

$$[\ 0\ 0\ 0.\ 1]$$
$$R_t = U_t^{-1}$$

For instance, the S indicates scaling, the R indicates rotation, and the T indicates transformation. Furthermore, in some embodiments, the design recolor system 102 removes translation, scaling, and rotation respectively for the digital design. Moreover, in some embodiments, the design recolor system 102 computes transformations for the digital image 402 (e.g., the source image), namely $S_s$, $R_s$, and $T_s$. Additionally, the design recolor system 102 correlates the normalized space for the digital design 400 with the normalized space of the digital image 402 as:

$$S_s \cdot R_s \cdot T_s \cdot C_s = S_t \cdot R_t \cdot T_t \cdot C_t \tag{4}$$

As shown in FIG. 4, the design recolor system 102 further applies a transformation 408 to generate a recolored digital design 410. For instance, the transformation 408 converts the digital image 402 to the look and feel of the digital design 400 as follows:

$$\Gamma := T_s^{-1} \cdot R_s^{-1} \cdot S_s^{-1} \cdot S_t \cdot R_t \cdot T_t \tag{5}$$

Furthermore, by applying the above transformation to each pixel of the digital design 400, the design recolor system 102 generates a transformed target image, or in other words generates the recolored digital design 410 indicated as follows:

$$t' = \Gamma \cdot t \tag{6}$$

Moreover, although not shown in FIG. 4, in one or more embodiments, the design recolor system 102 vectorizes the recolored result to generate the recolored digital design 410. For instance, the design recolor system 102 previously stores the vectorized information of the digital design 400 and in response to recoloring the digital design 400, the design recolor system 102 applies a vectorization algorithm. To illustrate, the design recolor system 102 processes the recolored rasterized version of the digital design 400 to convert it to vector paths and vector shapes based on the vectorized information stored by the design recolor system 102.

Figure 5:
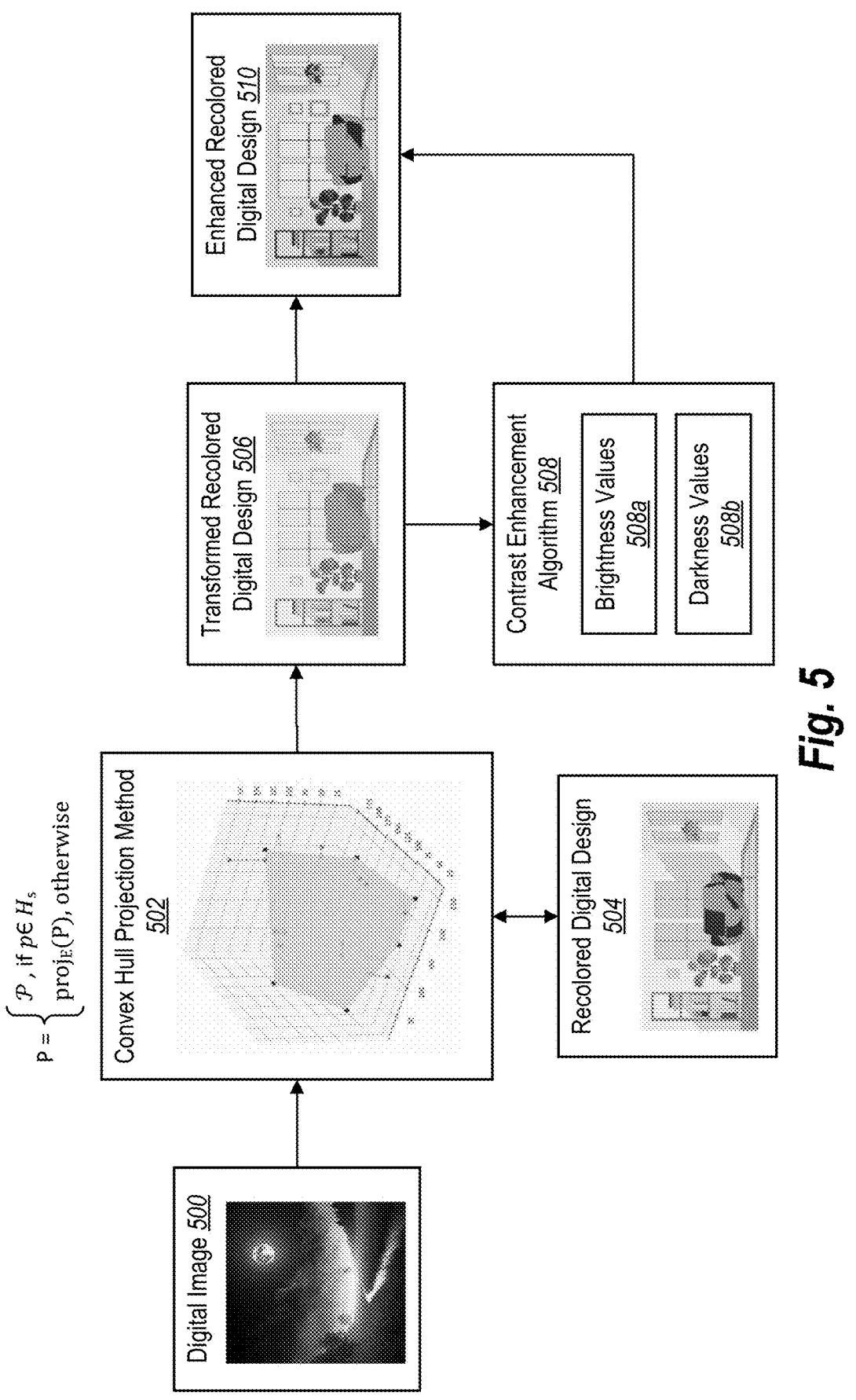
FIG. 5 illustrates a diagram of the design recolor system utilizing a convex hull projection method in accordance with one or more embodiments.

As mentioned above, the design recolor system 102 utilizes a convex hull projection method. For example, FIG. 5 shows the design recolor system 102 generating a convex hull from a digital image in accordance with one or more embodiments. In one or more embodiments, the design recolor system 102 utilizing the color affine transformation algorithm transfers colors from a digital image to a digital design and forces a few colors to be mapped far from the region of colors of the digital image color space. In particular, in some embodiments, due to the global transformation for a color transfer (as indicated in equation 6 above), unexpected colors without a connection to the digital image (e.g., the source image) appears in the transformed digital design (e.g., the recolored digital design 410).

For instance, in one or more embodiments, the design recolor system 102 overcomes issues of unexpected colors in the transformed digital design by utilizing a convex hull projection method 502. Specifically, the design recolor system 102 constructs a convex hull from colors of a digital image 500 and projects the newly mapped colors of a recolored digital design 504 to the convex hull's surface. In particular, the convex hull includes a set of points in a three-dimensional space. Further, the convex hull includes the smallest convex shape that contains the set of points.

In other words, the convex hull projection method 502 involves mapping colors from the digital image 500 to a geometric structure that encompasses all possible combinations of the colors of the digital image 500. Further, the transfer of the colors of the digital image 500 to a geometric structure preserves the relationships of between colors and ensures that the transferred colors remain within a feasible range.

To illustrate, the design recolor system 102 represents the convex hull as $H_s$ which utilizes the colors in $C_s$ (e.g., the digital image 500) as features points. Further, the design recolor system 102 represents colors present in the recolored digital design 504 as $C_{t'}$. Moreover, as shown in FIG. 5, the design recolor system 102 performs the convex hull projection method 502 defined as follows: for a point $p \in R$ and a convex hull H, let f be the face which is closest to p. Then for the function $proj_\varepsilon: \mathbb{R}^3 \to \mathbb{R}^3$, $proj_\varepsilon(p)$ is the point on the line segment from p to f such that the distance from f is epsilon. That is, $\|proj_\varepsilon(p) - f\|_2 = \varepsilon$.

Moreover, in one or more embodiments, for each color of $p \in C_{t'}$ the design recolor system 102 performs the following transformation:

$$P = \{p, \text{ if } p \in H_s$$
$$proj_\varepsilon(p), \text{ otherwise}$$
$$\}$$

In other words, the operation brings the color in $C_{t'}$ close to the colors in $C_s$. Furthermore, the degree of change for the color in $C_{t'}$ is controlled by the parameter E. Accordingly, as shown in FIG. 5, the design recolor system 102 transforms the colors of the recolored digital design 504 according to the convex hull of the digital image 500.

As shown in FIG. 5, the design recolor system 102, utilizing the convex hull projection method 502, generates a recolored digital design transformed according to the convex hull projection (e.g., the design recolor system 102 generates a transformed recolored digital design 506). Furthermore, in some embodiments, the transformed recolored digital design 506 suffers from unwanted dull colors. In particular, in some embodiments the convex hull projection method 502 results in multiple colors being mapped to nearby points on the convex hull which results in a loss of contrast (e.g., colors on the surface of the convex hull as a linear combination results in muted colors).

In one or more embodiments, the design recolor system 102 overcomes the problems associated with unwanted dull colors by utilizing a contrast enhancement algorithm 508. For instance, the design recolor system 102 boosts the contrast of the transformed colors by utilizing a histogram based on the contrast enhancement algorithm 508. Further, in utilizing the contrast enhancement algorithm 508, the design recolor system 102 operates in a LAB color space.

Specifically, the design recolor system 102 only modifies the lightness values (e.g., brightness values 508a and darkness values 508b) without modifying the hue values. For example, the LAB color space includes a luminescence channel, and the A and B channel represent color information. Further, the L channel includes a range of 0 to 100, where 0 indicates black and 100 indicates white. To illustrate, the design recolor system 102 utilizes the contrast enhancement algorithm 508 by implementing the details described in Arici Tarik, Dikbas Salih, and Altunbasak Yucel. A histogram modification framework and its application for image contrast enhancement. Image Processing, IEEE Transactions on, 18:1921-1935, 10 2009, which is fully incorporated by reference herein.

As shown in FIG. 5, the design recolor system 102 utilizes the contrast enhancement algorithm 508 to generate an enhanced recolored digital design 510. Specifically, the enhanced recolored digital design 510 overcomes issues of color dullness while successfully recoloring a digital design according to a digital image (e.g., a source image). To illustrate, FIG. 5 shows the digital image 500 with a cool color scheme (blues, whites, and blacks) and the recolored digital design 504 includes mostly cool colors however a sofa/couch depicted in the recolored digital design 504 includes a red color (e.g., not a cool color scheme). Further, based on the design recolor system 102 utilizing the convex hull projection method 502, the transformed recolored digital design 506 only includes cool colors consistent with the digital image 500. Moreover, the enhanced recolored digital design 510 further includes enhanced crisper colors (e.g., relative to the transformed recolored digital design 506).

In other words, the design recolor system 102 enhances the overall visual impact of the transformed recolored digital design 506 by increasing the color separation and intensifying the differences between various shades in the transformed recolored digital design 506 to generate the enhanced recolored digital design 510. Further, based on the design recolor system 102 applying the contrast enhancement algorithm 508, the transferred colors in the enhanced recolored digital design 510 become more vibrant and visually appealing.

As mentioned above, the design recolor system 102 utilizes a diffusion neural network to generate a digital image. For example, FIG. 6, shows the design recolor system 102 utilizing a diffusion neural network to generate a digital image to utilize for downstream tasks such as recoloring a digital design in accordance with one or more embodiments.

In one or more embodiments, the design recolor system 102 trains a diffusion neural network which includes receiving as input a digital image and adding noise to the digital image through a series of steps. For instance, the design recolor system 102 via the diffusion neural network maps a digital image to a latent space utilizing a fixed Markov chain that adds noise to the data of the digital image until the diffusion representation is diffused, destroyed, or replaced. Furthermore, each step of the fixed Markov chain relies upon the previous step. Specifically, at each step, the fixed Markov chain adds Gaussian noise with variance which produces a diffusion representation (e.g., diffusion latent vector, a diffusion noise map, or a diffusion inversion). The disclosed system can adjust the number of diffusion layers in the diffusion process (and the number of corresponding denoising layers in the denoising process).

Figure 6:
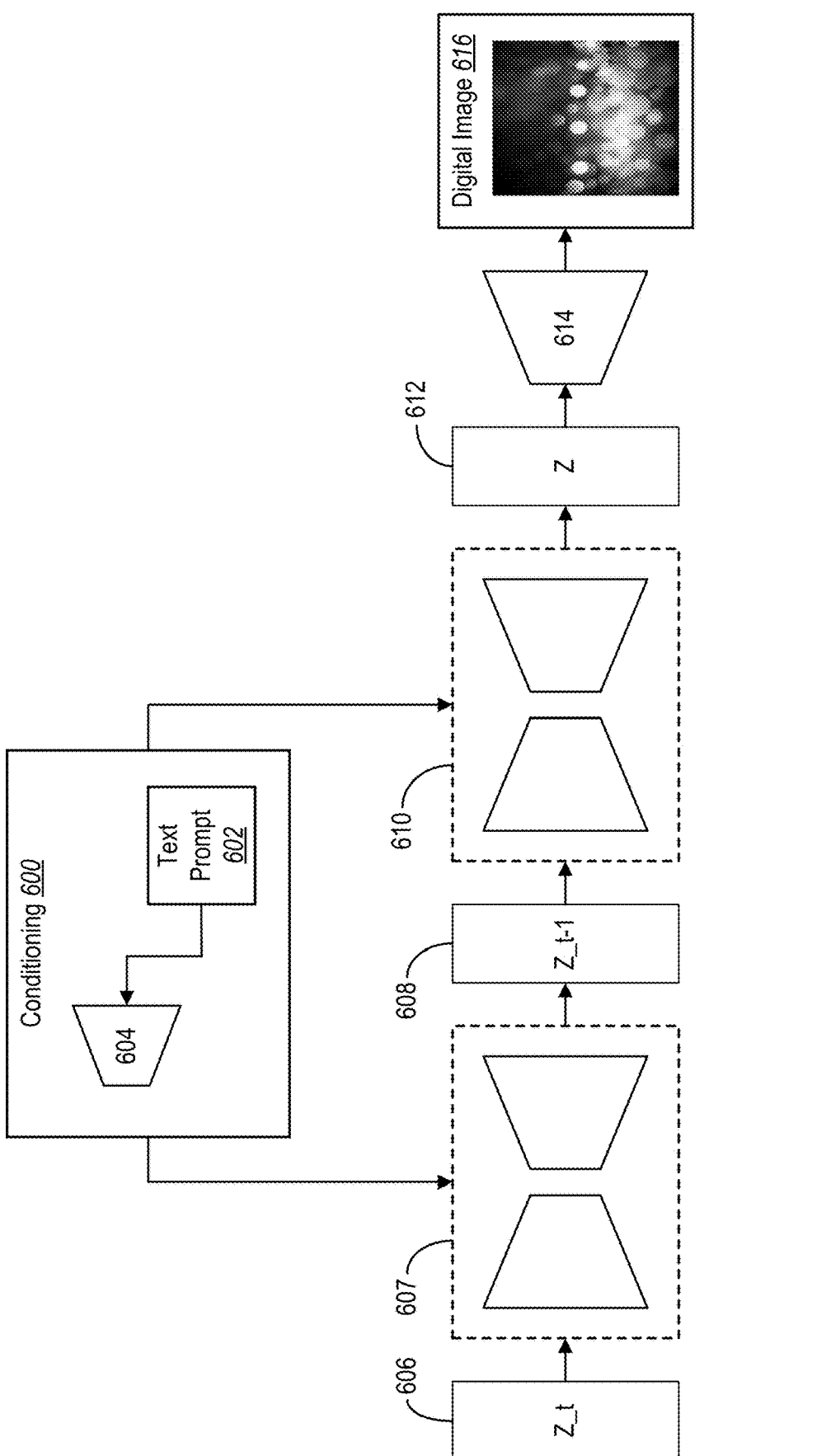
FIG. 6 illustrates a diagram of the design recolor system utilizing a diffusion neural network to generate a digital image in accordance with one or more embodiments.

As part of the diffusion neural network, the disclosed system also utilizes a denoising neural network (e.g., the portion shown in FIG. 6). Subsequent to adding noise to the digital image at various steps of the diffusion neural network, the design recolor system 102 for training purposes utilizes a denoising neural network to recover the original data from the digital image. Specifically, the disclosed system utilizes a denoising neural network with a length T equal to the length of the fixed Markov chain to reverse the process of the fixed Markov chain.

Post training, the design recolor system 102 utilizes the trained diffusion neural network, specifically the design recolor system 102 utilizes the denoising components of the diffusion neural network. As shown in FIG. 6, the design recolor system 102 receives a noise representation 606. In one or more embodiments, the noise representation 606 includes the addition of random noise as input data. For instance, the noise representation 606 includes Gaussian noise sampled from a normal distribution with a mean of zero and a specified standard deviation. The design recolor system 102 by utilizing a pre-trained diffusion neural network, processes the noise representation 606 to generate a text-conditioned image.

As further shown in FIG. 6, the design recolor system 102 conditions denoising neural networks 607 and 610 with a text prompt 602. For example, FIG. 6 illustrates the design recolor system 102 performing an act 600. In particular, the act 600 includes conditioning each layer of the denoising neural network 607 and the denoising neural network 610. To illustrate, conditioning layers of a neural network includes providing context to the networks to guide the generation of a digital image 616. For instance, conditioning layers of neural networks include at least one of (1) transforming conditioning inputs (e.g., the text prompt 602 via an encoder 604) into vectors to combine with the denoising representations; and/or (2) utilizing attention mechanisms which causes the neural networks to focus on specific portions of the input and condition its predictions (e.g., outputs) based on the attention mechanisms.

Specifically, for denoising neural networks, conditioning layers of the denoising neural networks includes providing an alternative input to the denoising neural networks (e.g., the text prompt 602). In particular, the design recolor system 102 provides alternative inputs to provide a guide in removing noise from the diffusion representation (e.g., the denoising process). Thus, the design recolor system 102 conditioning layers of the denoising neural networks acts as guardrails to allow the denoising neural networks to learn how to remove noise from an input signal and produce a clean output.

Moreover, conditioning the layers of the network includes modifying input into the layers of the denoising neural networks to combine with the noise representation. For instance, the design recolor system 102 combines (e.g., concatenates) vector values generated from the encoder at different layers of the denoising neural networks. For instance, the design recolor system 102 combines one or more conditioning vectors with the noise representation, or the modified noise representation. Thus, the denoising process considers the noise representation and the text vector representation (e.g., the text query) to generate text-conditioned images.

As shown in FIG. 6, the design recolor system 102 generates an additional noise representation 608 from the denoising neural network 607 processing the noise representation 606. Furthermore, FIG. 6 also shows the design recolor system 102 generating a final noise representation 612 from the denoising neural network 610 processing the additional noise representation 608. Moreover, FIG. 6 shows the design recolor system 102 utilizing a decoder 614 to generate the digital image 616 from the final noise representation 612.

Figure 7:
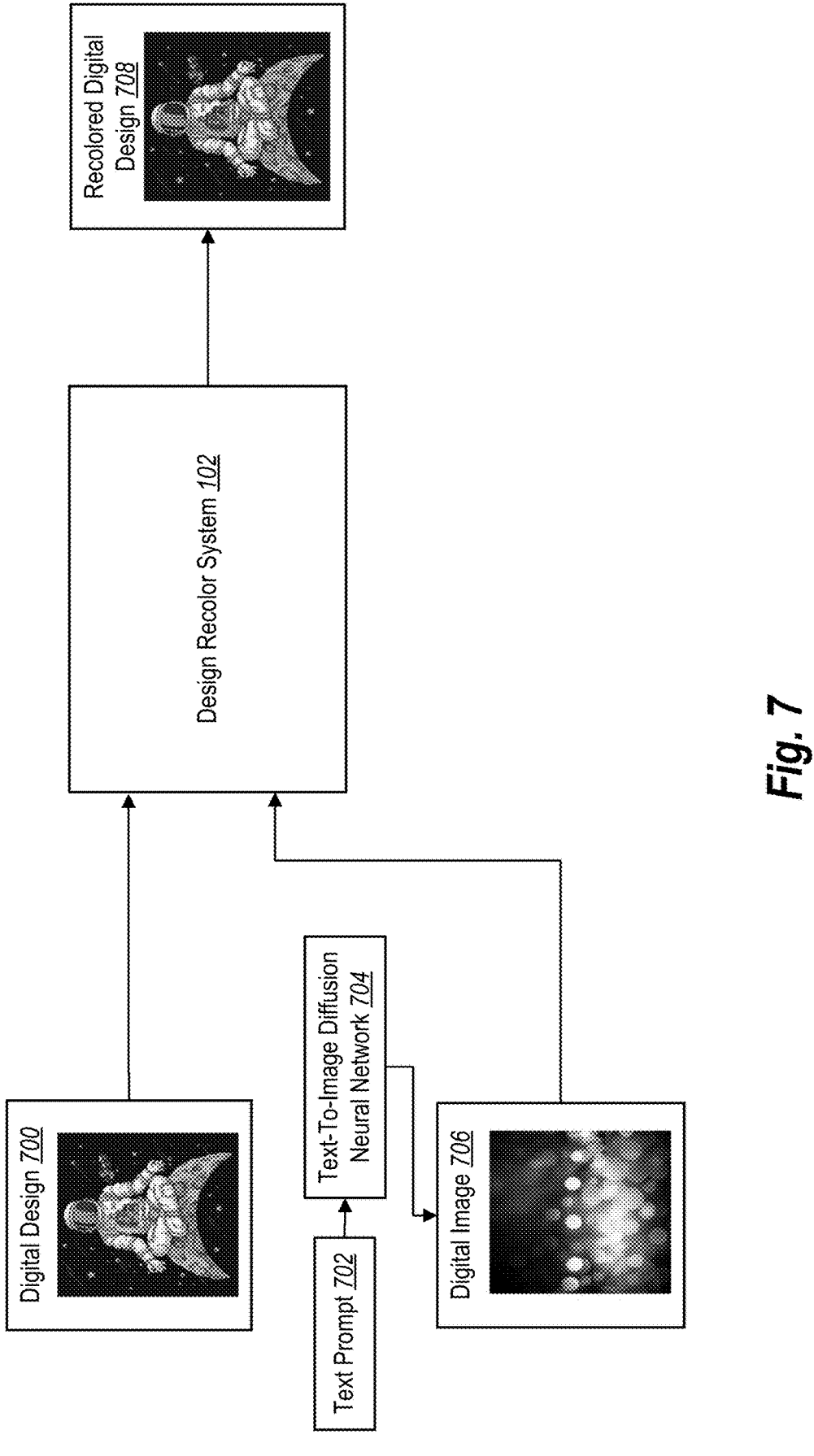
FIG. 7 illustrates an overview of workflow within the design recolor system for generating a recolored digital design in accordance with one or more embodiments.

FIG. 7 illustrates an overview of a designer workflow for generating a recolored digital design in accordance with one or more embodiments. For example, FIG. 7 shows the design recolor system 102 receiving an indication of a selection within a graphical user interface of a digital design 700 from a client device. Furthermore, FIG. 7 shows the design recolor system 102 receiving a text prompt 702. For instance, the design recolor system 102 utilizes a text-to-image diffusion neural network 704 (e.g., as discussed in FIG. 6) to process the text prompt 702 and generate a digital image 706.

As shown in FIG. 7, the design recolor system 102 transfers colors from the digital image 706 to the digital design 700 to generate a recolored digital design 708. In particular, the design recolor system 102 utilizes a color affine transformation algorithm that recolors the digital design 700 according to the colors of the digital image 706. Additionally, the design recolor system 102 provides the recolored digital design 708 to an application of the client device that initiated the recoloring task. To illustrate, FIG. 7 shows the digital design 700 with warm colors (reds and oranges) and the digital image 706 with cool colors (blues, and blacks) and the recolored digital design 708 conforms with the cool colors shown in the digital image 706.

In one or more embodiments, the design recolor system 102 applies quantization (e.g., the HSL clustering algorithm), the color affine transformation algorithm, the convex hull projection method, and then the contrast enhancement algorithm to generate the recolored digital design 708. Alternatively, in some embodiments, the design recolor system 102 utilizes any combination (removing one or more of the algorithms/methods) of the algorithms/methods to generate the recolored digital design 708.

Figure 8:
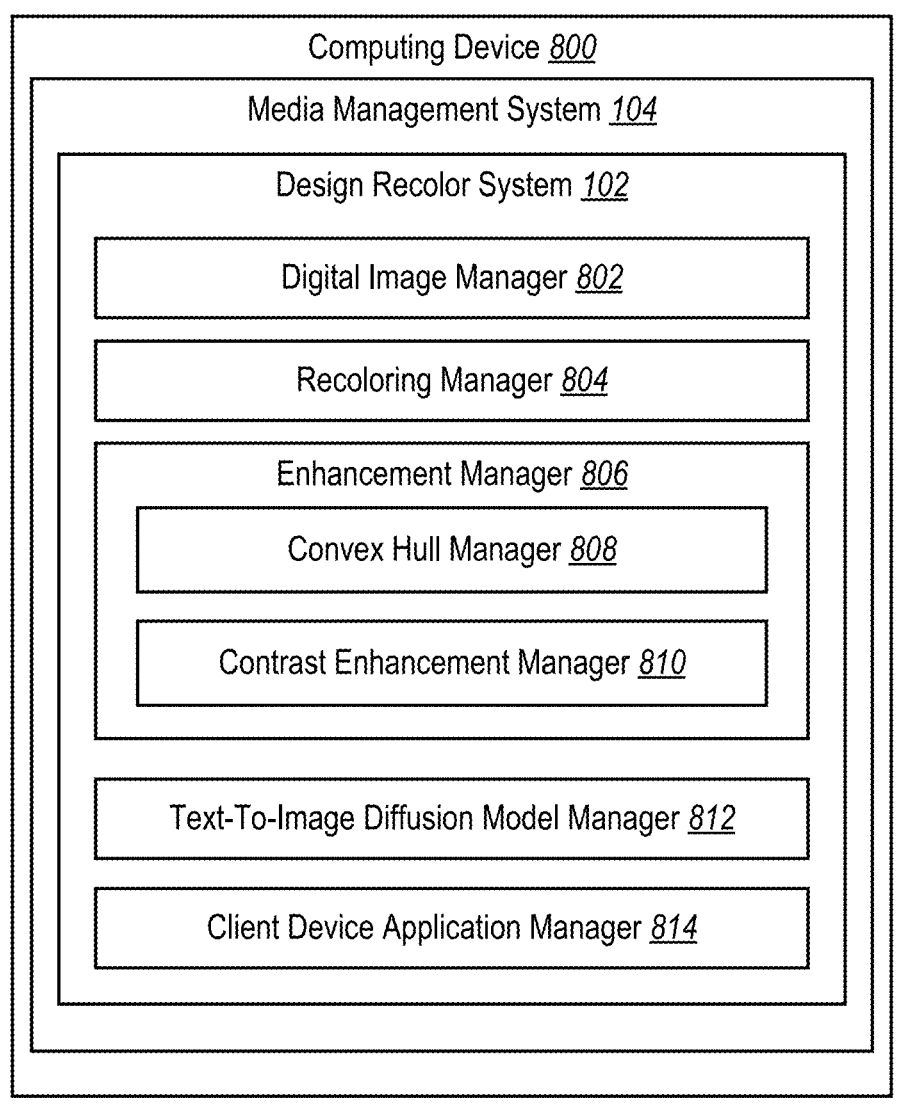
FIG. 8 illustrates an example schematic diagram of the design recolor system in accordance with one or more embodiments.

Turning to FIG. 8, additional detail will now be provided regarding various components and capabilities of the design recolor system 102. In particular, FIG. 8 illustrates an example schematic diagram of a computing device 800 (e.g., the server(s) 106 and/or the client device 110) implementing the design recolor system 102 in accordance with one or more embodiments of the present disclosure for components 800-814. As illustrated in FIG. 8, the design recolor system 102 includes a digital image manager 802, a recoloring manager 804, an enhancement manager 806, a convex hull manager 808, a contrast enhancement manager 810, a text-to-image diffusion model manager 812, and a client device application manager 814.

The digital image manager 802 identifies a digital image for recoloring a digital design. For example, the digital image manager 802 receives an input from a designer of a client device indicating a digital image. Specifically, the digital image manager 802 receives a text prompt from a designer of a client device and passes the text prompt to the text-to-image diffusion model manager 812 which then passes a digital image back to the digital image manager 802. Moreover, the digital image manager 802 then collaborates with other components such as the recoloring manager 804 to designate a source image (e.g., a reference source to recolor a digital design).

The recoloring manager 804 recolors a digital design. For example, the recoloring manager 804 recolors the digital design according to colors of the digital image as indicated by the digital image manager 802. Furthermore, the recoloring manager 804 further employs a color affine transformation algorithm. Specifically, the recoloring manager 804 utilizes a color affine transformation algorithm to transfer pixel color values from the digital image to the digital design.

The enhancement manager 806 generates an enhanced recolored digital design. For example, the enhancement manager 806 identifies deficiencies within the recolored digital design received from the recoloring manager 804 and determines to apply additional algorithms/methods to the recolored digital design. Furthermore, as shown in FIG. 8, the enhancement manager 806 includes the subcomponents of the convex hull manager 808 and the contrast enhancement manager 810.

The convex hull manager 808 transforms colors of the recolored digital design. For example, the convex hull manager 808 utilizes a convex hull projection method to transform one or more colors of the recolored digital design to be within a range of colors of the digital image. For instance, the convex hull manager 808 generates a convex hull of the digital image and projects colors of the recolored digital design to the convex hull to transform colors outside of the range of the digital image to conform with the range of the digital image.

The contrast enhancement manager 810 further modifies a recolored digital design. For example, the contrast enhancement manager 810 utilizes a contrast enhancement algorithm to modify values of a recolored digital design transformed according to the convex hull projection method. For instance, the contrast enhancement manager 810 modifies luminescence values of the recolored digital design but does not modify hue values.

The text-to-image diffusion model manager 812 receives text prompts from the digital image manager 802. In particular, the text-to-image diffusion model manager 812 generates a digital image from a text prompt utilizing various denoising neural networks conditioned on the text prompt. Furthermore, the text-to-image diffusion model manager 812 pre-trains a diffusion neural network for generating text-conditioned images.

The client device application manager 814 provides for display a recolored digital design and/or an enhanced recolored digital design. For example, the client device application manager 814 manages the graphical user interface for a user/designer of a client device to provide a text prompt input or for indicating the selection of a digital design (e.g., a target design). Further, the client device application manager 814 also manages the graphical user interface for the user designer to receive the recolored digital design. Additionally, the client device application manager 814 provides various options for the recoloring process such as initializing a number of color clusters or to indicate a specific color space to convert the digital design to.

Each of the components 802-814 of the design recolor system 102 can include software, hardware, or both. For example, the components 802-814 can include one or more instructions stored on a computer-readable storage medium and executable by processors of one or more computing devices, such as a client device or server device. When executed by the one or more processors, the computer-executable instructions of the design recolor system 102 can cause the computing device(s) to perform the methods described herein. Alternatively, the components 802-814 can include hardware, such as a special-purpose processing device to perform a certain function or group of functions. Alternatively, the components 802-814 of the design recolor system 102 can include a combination of computer-executable instructions and hardware.

Furthermore, the components 802-814 of the design recolor system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-814 of the design recolor system 102 may be implemented as a stand-alone application, such as a desktop or mobile application. Furthermore, the components 802-814 of the design recolor system 102 may be implemented as one or more web-based applications hosted on a remote server. Alternatively, or additionally, the components 802-814 of the design recolor system 102 may be implemented in a suite of mobile device applications or "apps." For example, in one or more embodiments, the design recolor system 102 can comprise or operate in connection with digital software applications such as ADOBE® CREATIVE CLOUD EXPRESS, ADOBE® PHOTOSHOP, ADOBE® ILLUSTRATOR, ADOBE® PREMIERE, ADOBE® INDESIGN, and/or ADOBE® EXPERIENCE CLOUD. "ADOBE," "PHOTO-SHOP," "INDESIGN," and "ILLUSTRATOR". The foregoing are either registered trademarks or trademarks of Adobe Inc. in the United States and/or other countries.

Figure 9:
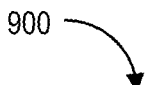
FIG. 9 illustrates a flowchart of a series of acts for providing a recolored digital design to a client device in accordance with one or more embodiments.

FIGS. 1-8, the corresponding text, and the examples provide a number of different methods, systems, devices, and non-transitory computer-readable media of the design recolor system 102. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for providing a recolored digital design to a client device in accordance with one or more embodiments. FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed as part of a computer-implemented method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device. The system further includes at least one server device configured to cause the system to perform the acts of FIG. 9.

The series of acts 900 includes an act 902 of receiving an indication of a section of a digital design. Further, the series of acts 900 includes an act 904 of receiving a text prompt. Moreover, the series of acts 900 includes an act 906 of generating, utilizing a text-to-image diffusion model, a digital image. Furthermore, the series of acts 900 includes an act 908 of generating a recolored digital design by utilizing an affine transformation. Moreover, the series of acts 900 includes an act 910 of providing the recolored digital design.

In particular, the act 902 includes receiving an indication of a selection within a graphical user interface of a digital design from a client device. Further, the act 904 includes receiving, via an input from the client device within the graphical user interface, a text prompt. Moreover, the act 906 includes generating, utilizing a text-to-image diffusion model, a digital image from the text prompt. Additionally, the act 908 includes generating a recolored digital design by utilizing an affine transformation that recolors the digital design based on colors of the digital image. Moreover, the act 910 includes providing, via the graphical user interface of the client device, the recolored digital design.

For example, in one or more embodiments, the series of acts 900 includes determining average color pixel values for similar colors of a first range of colors of the digital design. In addition, in one or more embodiments, the series of acts 900 includes utilizing the average color pixel values to reduce the first range of colors to a second range of colors smaller than the first range of colors. Further, in one or more embodiments, the series of acts 900 includes converting a first range of colors of the digital design comprising a first color space to a second color space. Specifically, converting the first range of colors of a first color space to a second color space by initializing, utilizing a clustering algorithm, a set of color clusters with a range of colors smaller than the first range of colors and clustering, utilizing the clustering algorithm, the first range of colors of the digital design to the set of color clusters.

Moreover, in one or more embodiments, the series of acts 900 includes generating a three-dimensional array representation of the colors of the digital image. Additionally, in one or more embodiments, the series of acts 900 includes generating a three-dimensional array representation of colors of the digital design. Further, in one or more embodiments, the series of acts 900 includes generating, from the three-dimensional array representation of the digital image a first set of arrays. Moreover, in one or more embodiments, the series of acts 900 includes generating, from the three-dimensional array representation of the digital design a second set of arrays.

Furthermore, in one or more embodiments, the series of acts 900 includes generating the recolored digital design by transforming the second set of arrays of the digital design according to the first set of arrays of the digital image. Additionally, in one or more embodiments, the series of acts 900 includes enhancing the recolored digital design by: identifying one or more colors of the recolored digital design outside of a range of colors of the digital image and utilizing a convex hull projection method to transform the identified one or more colors of the recolored digital design to be within the range of colors of the digital image.

Moreover, in one or more embodiments, the series of acts 900 includes enhancing the recolored digital design by modifying, utilizing a contrast enhancement algorithm, brightness or darkness values of colors in the recolored digital design transformed according to a convex hull projection method. Additionally, in one or more embodiments, the series of acts 900 includes receiving the text prompt that comprises one or more indications of colors.

FIG. 10 illustrates a flowchart of a series of acts 1000 for generating an enhanced recolored digital design in accordance with one or more embodiments. FIG. 10 illustrates acts according to one embodiment, alternative embodiments may omit, add to, reorder, and/or modify any of the acts shown in FIG. 10. In some implementations, the acts of FIG.

10 are performed as part of a method. For example, in some embodiments, the acts of FIG. 10 are performed as part of a computer-implemented method. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one memory device. The system further includes at least one server device configured to cause the system to perform the acts of FIG. 10.

The series of acts 1000 includes an act 1002 of identifying a digital image. Further, the series of acts 1000 includes an act 1004 of recoloring colors of the digital design according to colors of the digital image to generate a recolored digital design. Moreover, the series of acts 1000 includes an act 1006 of generating an enhanced recolored digital design. Furthermore, the series of acts 1000 includes sub-acts such as a sub-act 1008 transforming one or more colors of the recolored digital design to be within a range of the colors of the digital image. Moreover, the series of acts 1000 includes a sub-act 1010 of modifying luminescence values of the recolored digital design.

In particular, the act 1002 includes identifying a digital image for recoloring a digital design. Further, the act 1004 includes recoloring, utilizing a color affine transformation algorithm, colors of the digital design according to colors of the digital image to generate a recolored digital design. Moreover, the sub-act 1008 includes transforming, utilizing a convex hull projection method, one or more colors of the recolored digital design to be within a range of the colors of the digital image. Additionally, the sub-act 1010 includes modifying, utilizing a contrast enhancement algorithm, luminescence values of the recolored digital design transformed according to the convex hull projection method.

For example, in one or more embodiments, the series of acts 1000 includes determining a statistical distribution of a first range of colors of the digital design. In addition, in one or more embodiments, the series of acts 1000 includes from the statistical distribution, reducing the colors of the digital design to a second range of colors smaller than the first range of colors. Further, in one or more embodiments, the series of acts 1000 includes converting a first range of colors of the digital design within an RGB color space to an HSL color space. Moreover, in one or more embodiments, the series of acts 1000 includes initializing, utilizing a clustering algorithm, a set of color clusters with a range of colors smaller than the first range of colors. Further, in one or more embodiments, the series of acts 1000 clustering, utilizing the clustering algorithm, the first range of colors of the digital design to the set of color clusters.

Moreover, in one or more embodiments, the series of acts 1000 includes determining for a first color of the first range of colors, a hue value is within a predefined hue threshold of a first cluster of the set of color clusters, a saturation value matches a saturation value of the first cluster of the set of color clusters, and lightness value is within a predefined lightness threshold of the first cluster of the set of color clusters. Additionally, in one or more embodiments, the series of acts 1000 includes assigning the first color to the first cluster of the set of color clusters. Further, in one or more embodiments, the series of acts 1000 includes generating a three-dimensional array representation of the colors of the digital image.

Moreover, in one or more embodiments, the series of acts 1000 includes generating a three-dimensional array representation of colors of the digital design. Additionally, in one or more embodiments, the series of acts 1000 includes generating, a first set of arrays from the three-dimensional array representation of the digital image and a second set of arrays from the three-dimensional array representation of the digital design. Further, in one or more embodiments, the series of acts 1000 includes transforming the second set of arrays of the digital design according to the first set of arrays of the digital image.

Furthermore, in one or more embodiments, the series of acts 1000 includes generating a convex hull from the colors of the digital image. Additionally, in one or more embodiments, the series of acts 1000 includes projecting colors of the recolored digital design to the convex hull of the digital image. Moreover, in one or more embodiments, the series of acts 1000 transforming the colors of the recolored digital design to align with the convex hull. Further, in one or more embodiments, the series of acts 1000 includes modifying brightness or darkness values of the digital design.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
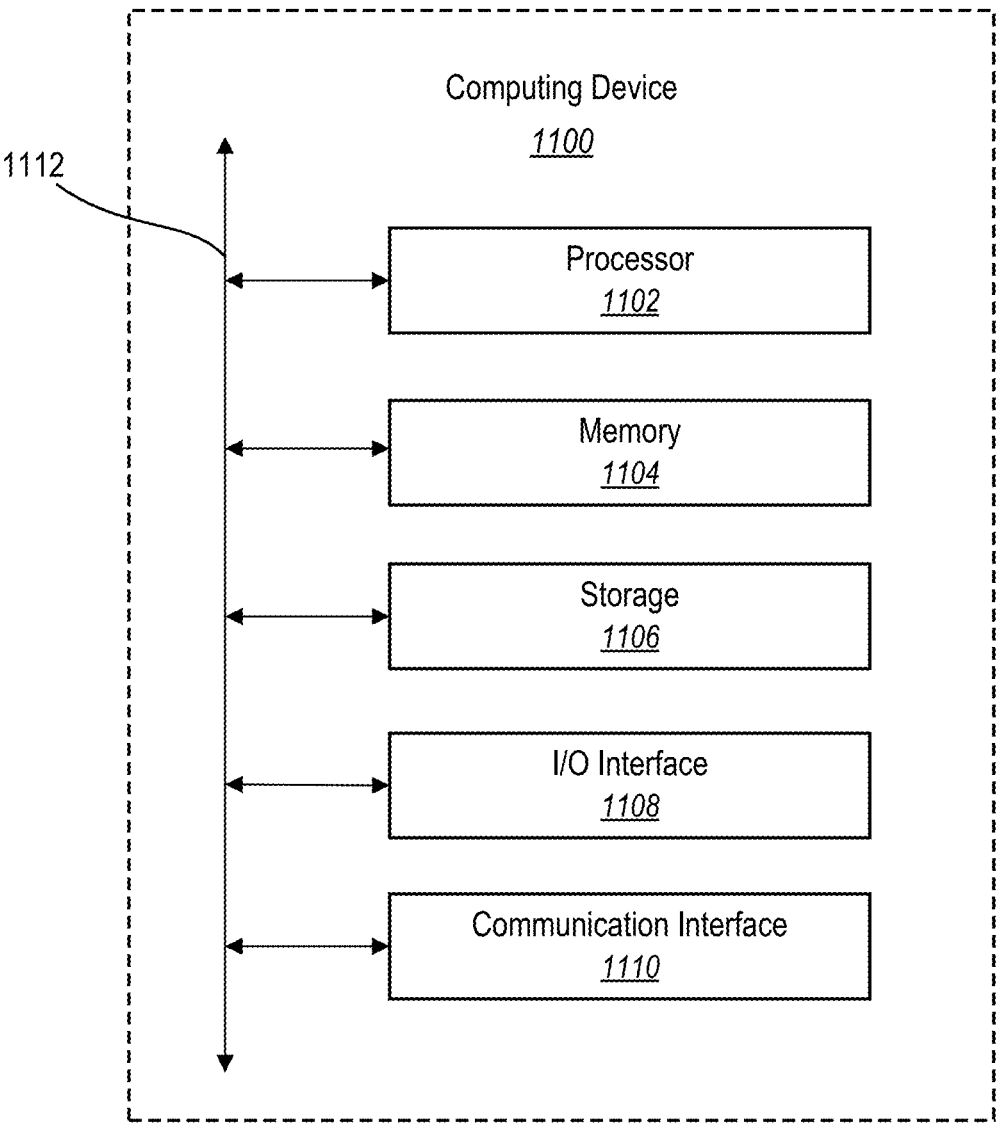
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 106 and/or the client device 110). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
one or more memory components; and
one or more processing devices coupled to the one or more memory components, the one or more processing devices to perform operations comprising:
    identifying a digital image for recoloring a digital design;
    recoloring, utilizing a color affine transformation algorithm, colors of the digital design according to colors of the digital image to generate a recolored digital design comprising mapped colors; and
    generating an enhanced recolored digital design by:

utilizing a convex hull projection method to construct a convex hull from the colors of the digital image;
        projecting the mapped colors of the recolored digital design toward the convex hull to generate transformed colors; and
        modifying, utilizing a contrast enhancement algorithm, luminescence values of the transformed colors to increase color separation.

2. The system of claim 1, wherein the operations further comprise:
determining a statistical distribution of a first range of colors of the digital design; and
from the statistical distribution, reducing the colors of the digital design to a second range of colors smaller than the first range of colors.

3. The system of claim 1, wherein the operations further comprise converting a first range of colors of the digital design within an RGB color space to an HSL color space.

4. The system of claim 3, wherein the operations further comprise:
initializing, utilizing a clustering algorithm, a set of color clusters with a range of colors smaller than the first range of colors; and
clustering, utilizing the clustering algorithm, the first range of colors of the digital design to the set of color clusters.

5. The system of claim 4, wherein utilizing the clustering algorithm comprises:
determining for a first color of the first range of colors, a hue value is within a predefined hue threshold of a first cluster of the set of color clusters, a saturation value matches a saturation value of the first cluster of the set of color clusters, and lightness value is within a predefined lightness threshold of the first cluster of the set of color clusters; and
assigning the first color to the first cluster of the set of color clusters.

6. The system of claim 1, wherein utilizing the color affine transformation algorithm comprises:
generating a three-dimensional array representation of the colors of the digital image;
generating a three-dimensional array representation of colors of the digital design;
generating, a first set of arrays from the three-dimensional array representation of the digital image and a second set of arrays from the three-dimensional array representation of the digital design; and
transforming the second set of arrays of the digital design according to the first set of arrays of the digital image.

7. The system of claim 1, wherein utilizing the convex hull projection method further comprises:
projecting the mapped colors towards a surface of the convex hull by transforming the mapped colors of the recolored digital design to align with the convex hull, wherein the mapped colors are treated as a set of points in a three-dimensional space;
determining a geometric structure that contains the set of points in the three-dimensional space as the geometric structure of the convex hull; and
generating a transformed recolored digital design based on the geometric structure of the convex hull.

8. The system of claim 1, wherein utilizing the contrast enhancement algorithm comprises modifying brightness or darkness values of the digital design.

9. A non-transitory computer-readable medium storing executable instructions which, when executed by at least one processing device, cause the at least one processing device to perform operations comprising:

identifying a digital image for recoloring a digital design;

recoloring, utilizing a color affine transformation algorithm, colors of the digital design according to colors of the digital image to generate a recolored digital design comprising mapped colors; and generating an enhanced recolored digital design by:

utilizing a convex hull projection method to construct a convex hull from the colors of the digital image;

projecting the mapped colors of the recolored digital design toward the convex hull to generate transformed colors; and modifying, utilizing a contrast enhancement algorithm, luminescence values of the transformed colors to increase color separation.

10. The non-transitory computer-readable medium of claim 9, wherein the operations further comprise:

determining a statistical distribution of a first range of colors of the digital design; and from the statistical distribution, reducing the first range of colors of the digital design to a second range of colors smaller than the first range of colors.

11. The non-transitory computer-readable medium of claim 9, wherein recoloring, utilizing the color affine transformation algorithm comprises:

generating a three-dimensional array representation of the colors of the digital image;

generating a three-dimensional array representation of colors of the digital design;

generating, a first set of arrays from the three-dimensional array representation of the digital image and a second set of arrays from the three-dimensional array representation of the digital design; and transforming the second set of arrays of the digital design according to the first set of arrays of the digital image.

12. The non-transitory computer-readable medium of claim 9, wherein generating an enhanced recolored digital design further comprises:

projecting the mapped colors toward a surface of the convex hull by transforming the mapped colors of the recolored digital design to align with the convex hull, wherein the mapped colors are treated as a set of points in a three-dimensional space;

determining a geometric structure that contains the set of points in the three-dimensional space as the geometric structure of the convex hull;

generating a transformed recolored digital design based on the geometric structure of the convex hull; and modifying the transformed recolored digital design by utilizing the contrast enhancement algorithm to modify brightness or darkness values to generate the enhanced recolored digital design.

13. A method comprising:

identifying a digital image for recoloring a digital design;

recoloring, utilizing a color affine transformation algorithm, colors of the digital design according to colors of the digital image to generate a recolored digital design comprising mapped colors; and generating an enhanced recolored digital design by:

utilizing a convex hull projection method to construct a convex hull from the colors of the digital image;

projecting the mapped colors of the recolored digital design toward the convex hull to generate transformed colors; and modifying, utilizing a contrast enhancement algorithm, luminescence values of the transformed colors to increase color separation.

14. The method of claim 13, further comprising:

determining a statistical distribution of a first range of colors of the digital design; and from the statistical distribution, reducing the colors of the digital design to a second range of colors smaller than the first range of colors.

15. The method of claim 13, further comprising converting a first range of colors of the digital design within an RGB color space to an HSL color space.

16. The method of claim 15, further comprising:

initializing, utilizing a clustering algorithm, a set of color clusters with a range of colors smaller than the first range of colors; and clustering, utilizing the clustering algorithm, the first range of colors of the digital design to the set of color clusters.

17. The method of claim 16, wherein utilizing the clustering algorithm comprises:

determining for a first color of the first range of colors, a hue value is within a predefined hue threshold of a first cluster of the set of color clusters, a saturation value matches a saturation value of the first cluster of the set of color clusters, and lightness value is within a predefined lightness threshold of the first cluster of the set of color clusters; and assigning the first color to the first cluster of the set of color clusters.

18. The method of claim 13, wherein utilizing the color affine transformation algorithm comprises:

generating a three-dimensional array representation of the colors of the digital image;

generating a three-dimensional array representation of colors of the digital design;

generating, a first set of arrays from the three-dimensional array representation of the digital image and a second set of arrays from the three-dimensional array representation of the digital design; and transforming the second set of arrays of the digital design according to the first set of arrays of the digital image.

19. The method of claim 13, wherein utilizing the convex hull projection method further comprises:

projecting the mapped colors towards a surface of the convex hull by transforming the mapped colors of the recolored digital design to align with the convex hull, wherein the mapped colors are treated as a set of points in a three-dimensional space;

determining a geometric structure that contains the set of points in the three-dimensional space as the geometric structure of the convex hull; and generating a transformed recolored digital design based on the geometric structure of the convex hull.

20. The method of claim 13, wherein utilizing the contrast enhancement algorithm comprises modifying brightness or darkness values of the digital design.

* * * * *